United States Patent
Raguseo et al.

(10) Patent No.: US 7,454,463 B2
(45) Date of Patent: Nov. 18, 2008

(54) METHOD AND SYSTEM FOR DOWNLOADING SOFTWARE PRODUCTS WITH REDUCED TRANSMISSION TIME

(75) Inventors: Domenico Raguseo, Rome (IT); Marco Loperfido, Rome (IT)

(73) Assignee: International Business Machines Corporation, Armonk, NY (US)

( * ) Notice: Subject to any disclaimer, the term of this patent is extended or adjusted under 35 U.S.C. 154(b) by 716 days.

(21) Appl. No.: 11/141,580

(22) Filed: May 31, 2005

(65) Prior Publication Data
US 2006/0031528 A1    Feb. 9, 2006

(30) Foreign Application Priority Data
Jun. 1, 2004  (EP) ................... 04102418

(51) Int. Cl.
*G06F 15/16* (2006.01)

(52) U.S. Cl. .................. 709/203; 709/213; 709/217; 709/234; 709/236

(58) Field of Classification Search .................. 709/203, 709/213, 217, 234, 236
See application file for complete search history.

(56) References Cited

U.S. PATENT DOCUMENTS

| | | | |
|---|---|---|---|
| 5,987,506 A * | 11/1999 | Carter et al. ................. | 709/213 |
| 6,760,765 B1 * | 7/2004 | Asai et al. ................... | 709/226 |
| 7,191,180 B2 * | 3/2007 | Evans et al. .................. | 707/10 |

* cited by examiner

*Primary Examiner*—Michael Won
(74) *Attorney, Agent, or Firm*—Duke W. Yee; Jeffrey S. LaBaw (57) ABSTRACT

A method and a corresponding system for downloading software products (from a server to a client) are provided. The downloading of the product is started by the server as usual. Each proxy between the server and the client detects the starting of the downloading. If the proxy has a copy of the same product already available in its cache, the proxy notifies the server accordingly. In this case, the server stops the downloading. The product is instead provided to the client directly by the proxy. As a result, the time required for the downloading is strongly reduced; however, this result is achieved without adversely affecting the security of the process (since it is always controlled by the server directly).

9 Claims, 5 Drawing Sheets

METHOD AND SYSTEM FOR DOWNLOADING SOFTWARE PRODUCTS WITH REDUCED TRANSMISSION TIME

TECHNICAL FIELD

The present invention relates to the data processing field. More specifically, the present invention relates to a method of downloading digitally encoded products. The invention further relates to a computer program for performing the method, and to a product embodying the program. Moreover, the invention also relates to a corresponding data processing system.

BACKGROUND ART

Distributed data processing systems have become very popular in the last years, especially thanks to the widespread diffusion of the Internet. The Internet is a global network with a client/server architecture, in which a great number of users access shared resources managed by server computers (through their own client computers).

Those services typically involve the downloading of a large amount of information from the servers to the clients. In this context, caching techniques are commonly used to improve the speed of the process and also reduce Internet traffic. A cache is a structure (being closer to the client than the server is), which stores information temporarily; in this way, when the same information is requested again, it can be obtained from the cache rather than the server.

For example, proxy servers are interposed between the clients and the actual servers; each proxy is provided with a local cache. The proxy receives any request for an Internet service from associated clients (for example, to fetch a desired web page). The proxy then verifies whether the requested web page is already available in its local cache. If so, the web page is returned to the client without needing to forward the request to the server (otherwise, the proxy addresses the request to the server on behalf of the client).

Another solution known in the art consists of distributing frequently accessed information to cache servers that are periodically refreshed; each cache server is arranged relatively close to the clients, and typically within a corporate network. Even in this case, successive requests for the same information can be satisfied by the cache servers directly without requiring any access to the servers.

However, none of the solutions described above can be applied when the downloading of the information must be controlled by the server directly. A typical scenario is the distribution of valuable information (such as software products) from the server to the client (for example, during an e-commerce transaction). In this case, it is evident that the software products must be downloaded only from the server to the clients that have been authorized. Conversely, the above-described caching techniques would result in unaccounted distribution and use of the software products (with corresponding unpaid royalties for their publishers).

Therefore, in the above-described situation the requested information must be always provided by the server directly. As a result, the process is extremely time-consuming (especially when the server is far away from the client and/or a relatively slow connection is available). Moreover, this causes an increment of the traffic on the Internet, with a detrimental effect on its performance. An additional drawback results from the fact that the high distance between the client and the server (in terms of either physical space or number of interposed devices) increases the risk of interruption of the connection; in this case, the process must be repeated with the transmission of additional information.

SUMMARY OF THE INVENTION

The present invention proposes a solution, which is motivated by the need of reducing the time required to download products from a source computer to a target computer, but at the same time maintaining a central control of the process. For this purpose, the source computer starts delivering the product as usual. Another computer having a copy of the product available detects the starting of the delivering. The delivering is then performed by this computer directly (with the source computer that is notified to stop the process).

Particularly, an aspect of the present invention provides a method of downloading digitally encoded products in a data processing system with distributed architecture. The method begins with a source computer that starts delivering a product to a target computer. An intermediate computer (between the source computer and the target computer) detects the starting of the delivering. The intermediate computer verifies an availability of a copy of the product on the intermediate computer. The intermediate computer then notifies the availability to the source computer. In response to the notification of the availability, the source computer stops the delivering. The intermediate computer then delivers the copy of the product to the target computer.

Preferably, the product includes a plurality of consecutive packets; the source computer then associates a first packet with identification information of the product.

A suggested choice for implementing the association of the identification information with the first packet is to encapsulate the packet into a predefined frame including the identification information. In this case, the target computer extracts the first packet and the intermediate computer extracts the identification information from the frame.

In a preferred embodiment of the invention, the intermediate computer stores a memory structure including an indication of the products that are available thereon; the verification of the availability of the copy of the product on the intermediate computer is then performed by searching the indication of the product in the memory structure.

A way to further improve the solution is to scan the intermediate computer periodically; the memory structure is then updated according to a result of the scanning.

As a further enhancement, the source computer enables the intermediate computer to deliver the copy of the product to the target computer in response to the notification of the availability.

Advantageously, the intermediate computer also notifies the completion of the delivering to the source computer.

A further aspect of the present invention provides a computer program for performing the above-described method.

A still further aspect of the invention provides a program product embodying this computer program.

Moreover, another aspect of the invention provides a corresponding data processing system with distributed architecture for downloading digitally encoded products.

The solution of the invention strongly reduces the time required for the downloading of the products; this advantage is clearly perceived when the source computer is far away from the target computer and/or a relatively slow connection is available.

At the same time, this involves a substantial reduction of the traffic on a network, which is used to connect the target computer to the source computer; as a result, the overall performance of the system is improved.

In addition, the proposed solution reduces the (physical and/or logical) transmission distance, so that the risk of interruption of the connection is lowered (thereby avoiding repeating the transmission).

The above-mentioned results are achieved maintaining the downloading under the control of the source computer. In this way, the solution of the invention does not adversely affect the security of the system; therefore, this mechanism is well suited to the distribution of valuable information.

The novel features believed to be characteristic of this invention are set forth in the appended claims. The invention itself, however, as well as these and other related objects and advantages thereof, will be best understood by reference to the following detailed description to be read in conjunction with the accompanying drawings.

DETAILED DESCRIPTION OF THE PREFERRED EMBODIMENT(S)

Figure 1A:
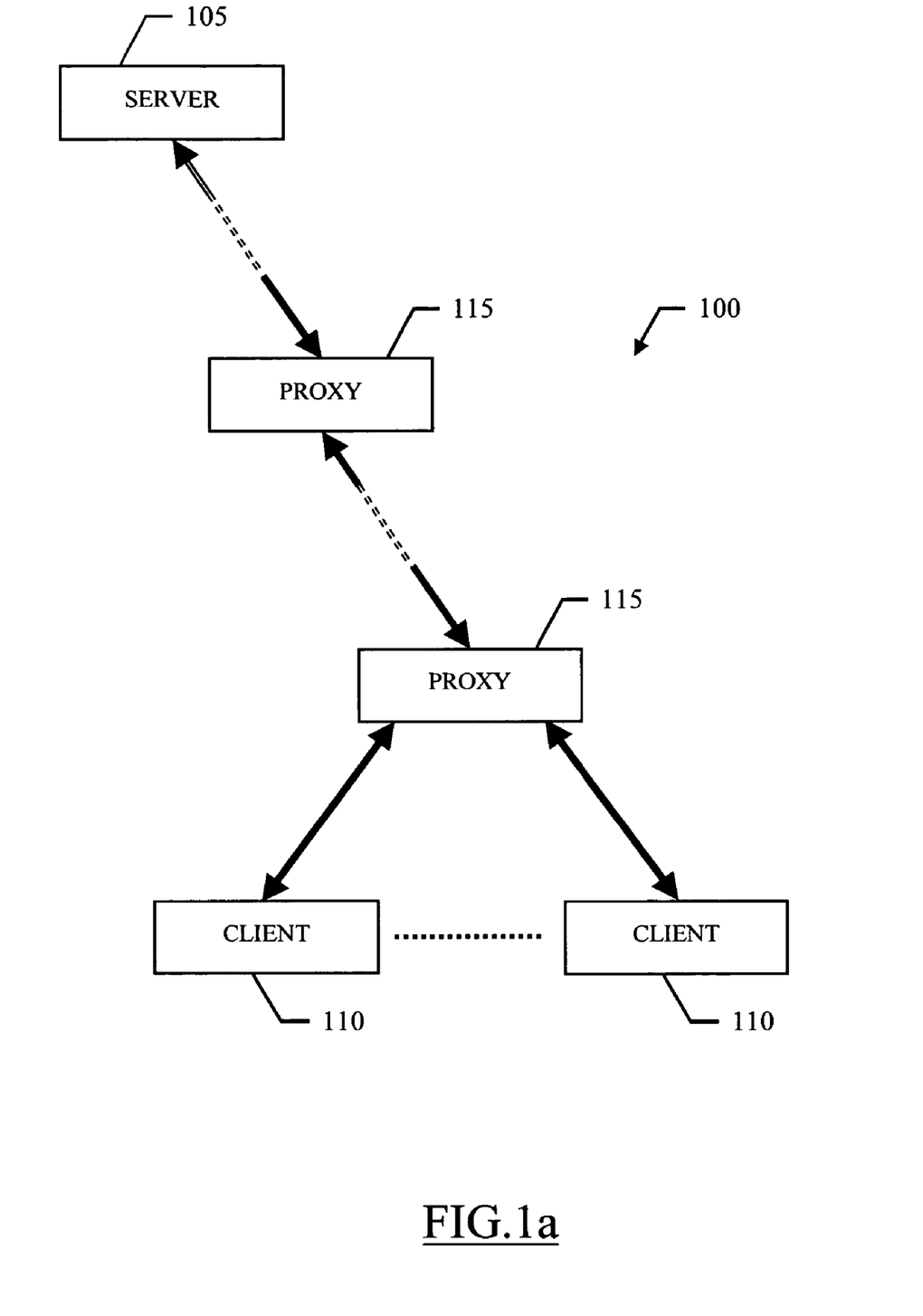
FIG. 1a is a schematic block diagram of a data processing system in which the method of the invention is applicable.

With reference in particular to FIG. 1a, a data processing system 100 with distributed architecture is illustrated. The system 100 has a client/server architecture, wherein server computers 105 (only one shown in the figure) provide shared resources. Multiple client computers 110 access those shared resources through a communication network (typically Internet-based); for example, the clients 110 can download selected software products (such as utility programs, application packages, and the like) from the server 105.

Different groups of clients 110 (for example, in the same company or department) are clustered around a proxy computer 115, which is associated with or part of a gateway that separates the corresponding clients 110 from the outside network. The proxy 115 acts as an intermediary between the clients 110 and the server 105. For this purpose, the clients 115 are configured specifying an address of the proxy 115 as an option; in this way, all the requests of the clients 110 are sent to the proxy 115, which manages them on behalf of the clients 110. In addition, the proxy 115 implements a caching mechanism for storing the received information temporary. Typically, the proxy 115 also acts as a firewall, which filters the traffic with the outside to prevent any intrusion. Typically, multiple proxies 115 are interposed between each client 110 and the server 105. The proxies 115 are organized into a hierarchy, wherein low level proxies 115 act as clients for higher-level proxies 115 (closer to the server 105).

Figure 1B:
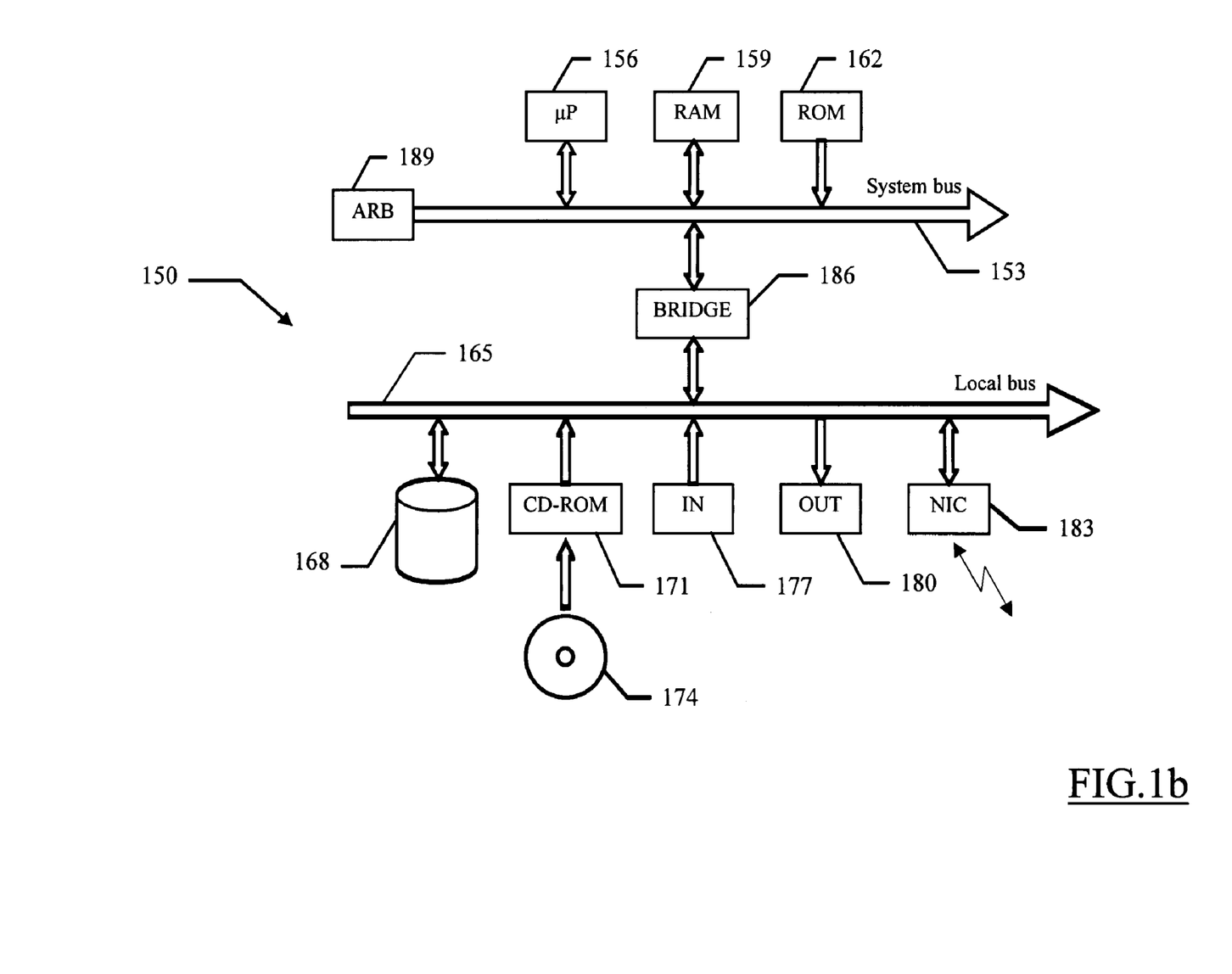
FIG. 1b shows the functional blocks of a generic computer of the system.

As shown in FIG. 1b, a generic computer of the system (server, client or proxy) is denoted with 150. The computer 150 is formed by several units that are connected in parallel to a system bus 153. In detail, one or more microprocessors (μP) 156 control operation of the computer 150; a RAM 159 is directly used as a working memory by the microprocessors 156, and a ROM 162 stores basic code for a bootstrap of the computer 150. Peripheral units are clustered around a local bus 165 (by means of respective interfaces). Particularly, a mass memory consists of a hard-disk 168 and a drive 171 for reading CD-ROMs 174. Moreover, the computer 150 includes input devices 177 (for example, a keyboard and a mouse), and output devices 180 (for example, a monitor and a printer). A Network Interface Card (NIC) 183 is used to connect the computer 150 to the network. A bridge unit 186 interfaces the system bus 153 with the local bus 165. Each microprocessor 156 and the bridge unit 186 can operate as master agents requesting an access to the system bus 153 for transmitting information. An arbiter 189 manages the granting of the access with mutual exclusion to the system bus 153.

Similar considerations apply if the system has a different topology, or it is based on another network (for example, a LAN). Alternatively, the computers have a different structure, include equivalent units, or consist of other data processing entities (such as PDAs, mobile phone, and the like).

Figure 2:
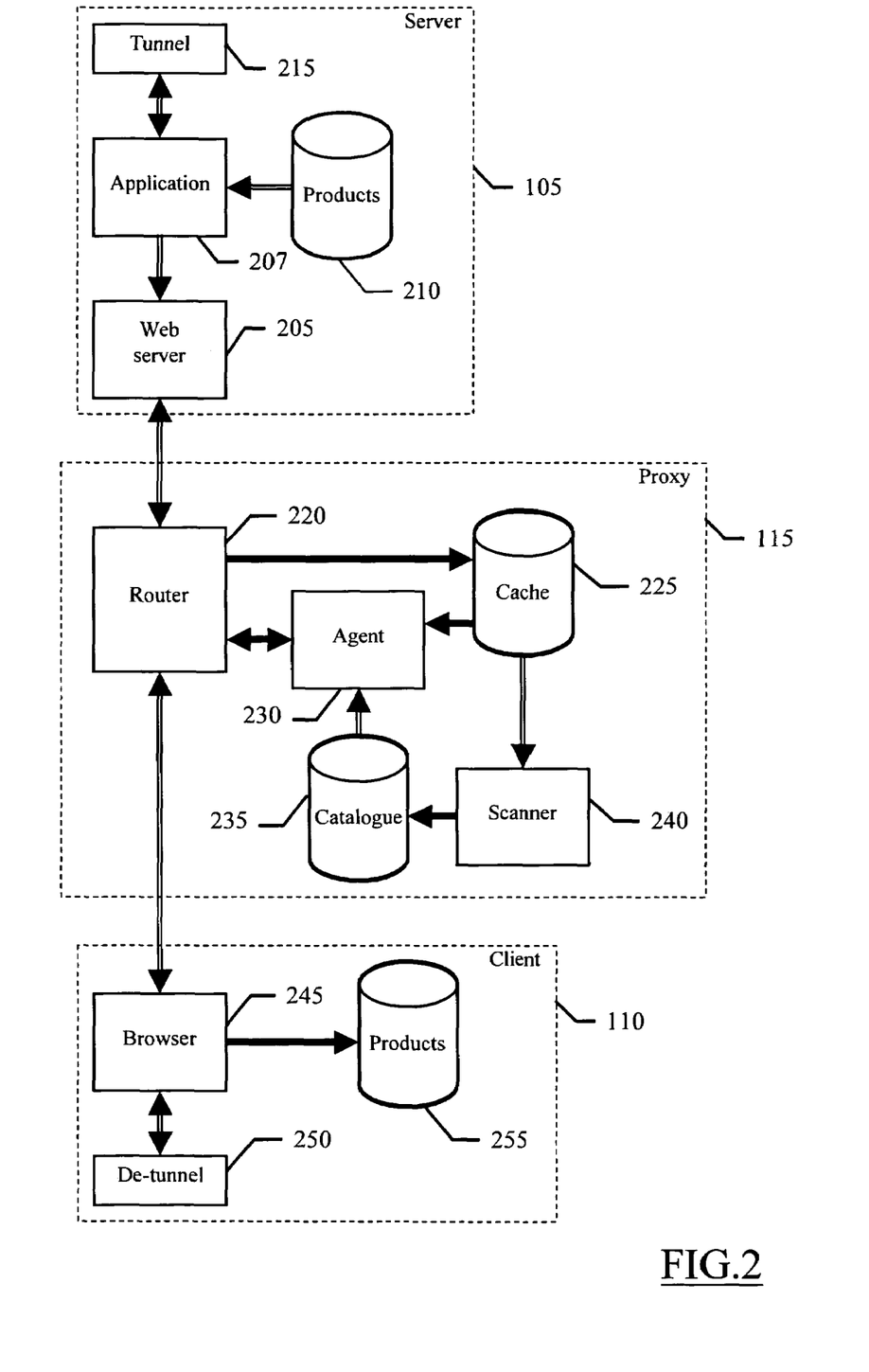
FIG. 2 depicts the main software components that can be used for practicing the method.

Considering now FIG. 2, the main software components that can be used to practice the method of the invention are illustrated. The information (programs and data) is typically stored on the hard-disks and loaded (at least partially) into the corresponding working memories when the programs are running. The programs are initially installed onto the hard-disks from CD-ROMs.

Considering in particular the server 105, a web server module 205 manages the communications with the other computers of the system. Typically, the communications are based on the TCP/IP protocol, which implements a socket mechanism; a socket is a virtual connection that defines an endpoint of a communication (identified by a network address and a port number indicating a corresponding logical channel). The TCP/IP supports a packet-switched technique, wherein the information to be transmitted is divided into small units of an efficient size (called packets). Each packet is separately numbered and includes an address of its destination. In this way, the packets can be routed through the network independently based on their destination address. When all the packets are received, they are reassembled into the original information (according to the correct sequence defined by their numbers).

Different applications 207 are invoked by the web server 205 (in response to corresponding commands submitted by the clients 110). In the example at issue, a specific application 207 implements an e-commerce infrastructure. Particularly, the application 207 provides a web interface that allows a user of a generic client 110 to select desired software products from a catalogue; the selected software products are bought (for example, paying with a credit card) and then downloaded to the client 110.

For this purpose, the application 207 accesses a repository 210 storing a copy of all the available software products. The application 207 also interfaces with a tunneling module 215. The tunnel 215 encapsulates a first packet of each software product to be downloaded into a predefined frame. The frame includes information for identifying the software product; for example, the identification information consists of the names of one ore more signature files (with the corresponding sizes and timestamps), which signature files uniquely identify the software product.

Moving now to a generic proxy 115, a routing module 220 manages the communications between the associated clients 110 and the server 105 (for the sake of simplicity, the proxy 115 is shown in the figure as directly connected to a generic client 110 and to the server 105). Particularly, the router 220 receives any request from the client 110. The router 220 uses the address of the proxy 115 for submitting the request to the server 105. When the corresponding information is returned, the router 220 relates the information to the original request and forwards it to the client 110.

The router 220 is in a position to cache the received information into a corresponding structure 225; the cache 225 also includes the modules implementing the functions that are required for its correct management (for example, to claim new space or to invalidate information following an interruption of the corresponding transmission).

An agent 230 running in the background controls the downloading of each software product according to an embodiment of the present invention. Particularly, the agent 230 intercepts the (tunneled) first packet of the software product that is received from the server 105. The agent 230 interprets the corresponding frame (so as to extract the identification information of the respective software product), and then verifies whether a copy of this software product is already available in the cache 225; if so, the agent transmits the copy of the software product from the cache 225 to the client directly (at the same time causing the server to stop the delivering). For this purpose, the agent 230 accesses a catalogue 235, which stores a list of all the software products available in the cache 225 (identified by the corresponding signature files). The catalogue 235 is built under the control of a scanner 240; the scanner 240 periodically analyzes the cache 225 to identify the available software products (according to their signature files).

The proxy 115 is closer to the client 110 that the server 105 is; moreover, the proxy 115 is typically coupled with the corresponding clients 110 through a relatively fast connection. As a result, the time required to download the software product is substantially lowered; at the same time, the traffic on the Internet (outside the proxy 115) is strongly reduced. In addition, the shorter distance of the proxy 115 from the client 110 (and the generally higher reliability of the corresponding network) also lowers the risk of interruption of the connection. In any case, only the server 105 can authorize the downloading; in other words, the proxy 115 cannot transmit any information in the cache 225 of its own motion. As a result, any uncontrolled distribution of the software products is prevented.

With reference to the client 110, a browser 245 allows the user to surf through the Internet, in order to locate and display desired web pages; in the example at issue, the browser 245 is used to access the application 207 for downloading the software products. For this purpose, the browser 245 is provided with a plug-in de-tunneling module 250; the de-tunnel 250 is used to extract the first packet of the software product from the corresponding frame. The browser 245 can then reassemble the received software product (denoted with 255) and install it on the client 105. Similar considerations apply if the programs and the corresponding data are structured in another manner, or if different modules or functions are provided.

Figure 3A:
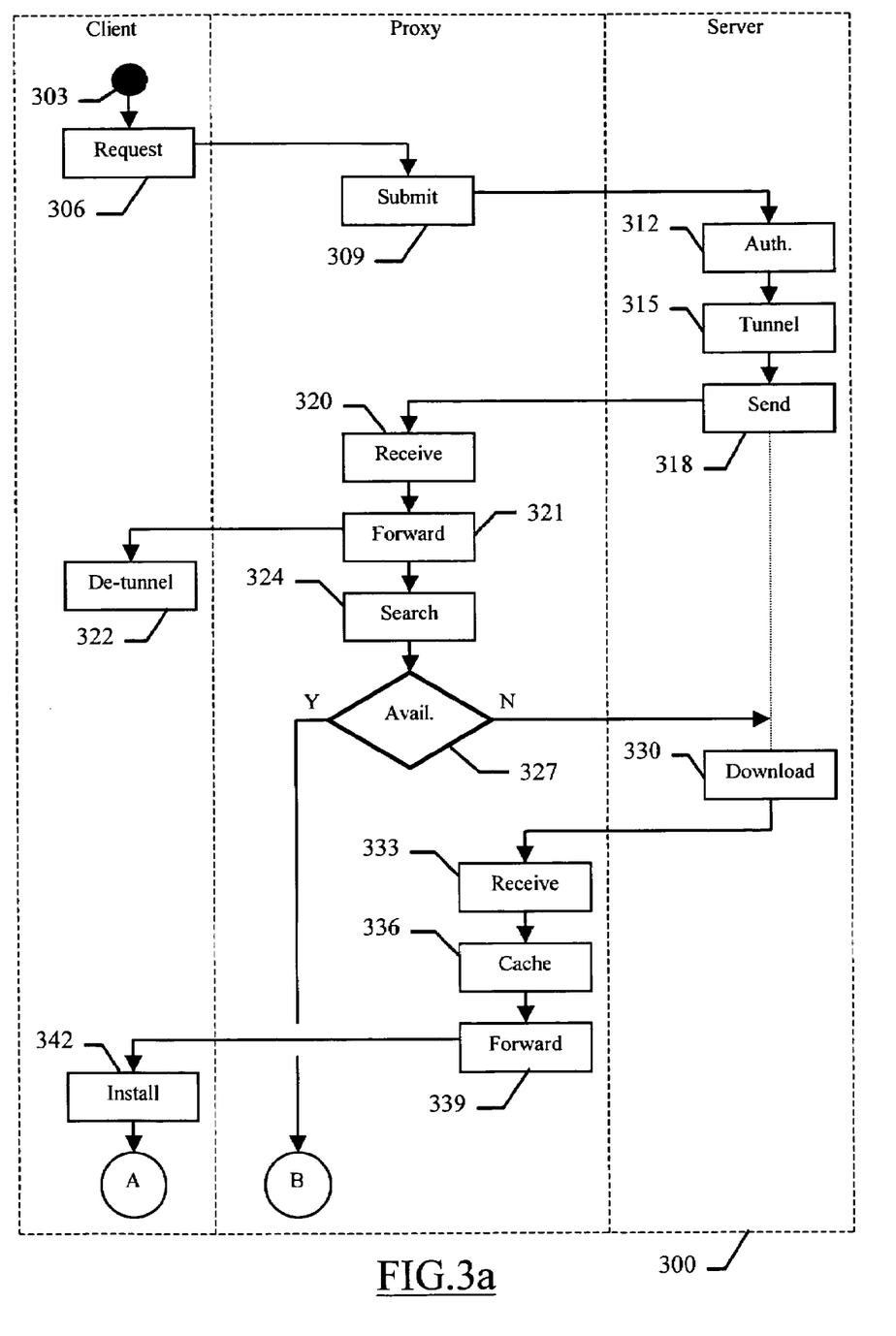
FIGS. 3a-3b show a diagram describing the flow of activities relating to an illustrative implementation of the method.
Figure 3B:
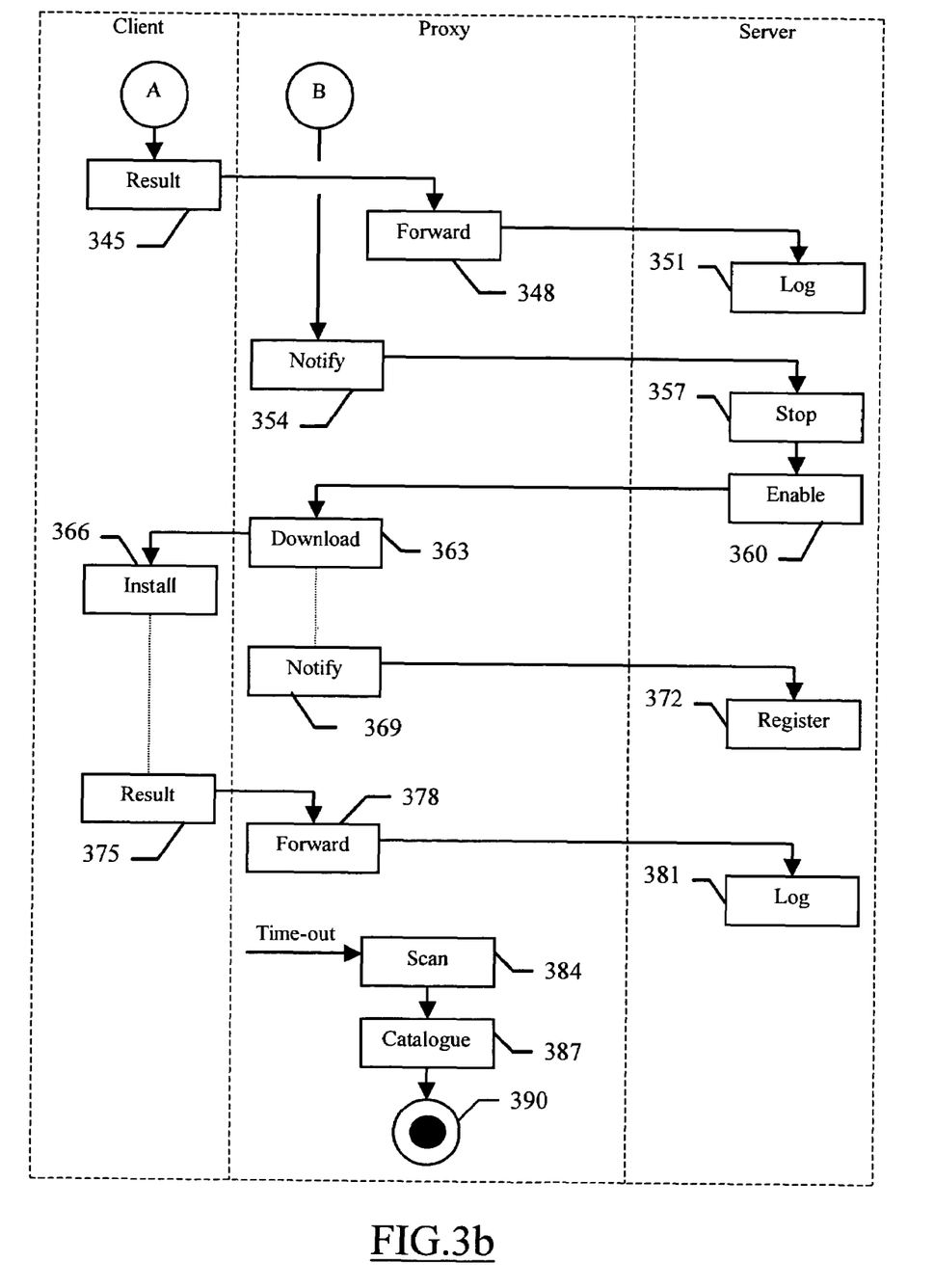

Considering now FIGS. 3a-3b, the logic flow corresponding to the downloading of a generic software product according to an embodiment of the invention is represented with a method 300. The method begins at the black start circle 303 in the swim-lane of a client. Continuing to block 306, a request for the desired software product is submitted to the server through the proxy. In response thereto, the proxy at block 309 passes the request to the server using its own address. The server then implements a procedure for authorizing the request of the client; this procedure is schematically represented in the figure with the block 312, and typically includes an authentication phase, the establishing of a secure communication for transmitting sensitive information (such as a credit card number), and the like. Assuming that the client has been correctly authorized to download the software product, the server at block 315 tunnels the corresponding first packet (by encapsulating the same into a frame with the respective identification information). The (tunneled) first packet is then sent to the proxy at block 318. This feature strongly facilitates the verification of the availability of the software product on each proxy; moreover, the tunneling technique provides the additional advantage of establishing a transparent pipe between the server and the proxy.

Moving now to the swim-lane of the proxy, the first packet is received at block 320. The method continues to block 321, wherein the first packet is related to the original request and then forwarded to the client. In response thereto, the client at block 322 de-tunnels the first packet (so as to extract its actual content from the corresponding frame); in this way, the whole process is completely opaque to the client. At the same time, the proxy at block 324 detects the starting of the downloading (according to the format of the received frame); as a result, the proxy extracts the identification information of the software product from the frame, and then searches this software product in the catalogue; the proposed feature strongly reduces the time required by the proxy for carrying out the verification.

If the proxy determines at decision block 327 that the software product is not available, no operation is performed. In this case, the flow of activity returns to block 330, wherein the server continues the delivering of the other packets of the software product as usual. Each packet is received by the proxy at block 333. Continuing to block 336, the packet is stored into the cache of the proxy. The packet is likewise related to the original request and forwarded to the client at block 339. Considering now block 342, all the packets are reassembled by the client and the corresponding software product can then be installed. A result of the process is returned at block 345 to the server through the proxy. In response thereto, the proxy at block 348 forwards the result to the server. The server then logs the information at block 351.

Returning to the decision block 327, if a copy of the software product is already available on the proxy the flow of activity descends into block 354; in this case, the proxy notifies the server of the availability of the software product. As a result, the server at block 357 stops the downloading process. Passing to block 360, the server enables the proxy to deliver its copy of the software product directly; this additional feature further improves the security of the process. In response thereto, the proxy at block 363 sends the other packets of the software product to the client. Considering now block 366, the packets are likewise re-assembled by the client and the corresponding software product is installed. Once all the packets have been provided to the client, the proxy at block 369 notifies the completion of the downloading to the server. As a result, the server registers the event at block 372. In this way, the process is completely opaque to the server. Returning to the swim-lane of the client, a result of the process is returned at block 375 to the server through the proxy. In response thereto, the proxy at block 378 forwards the result to the server. The server likewise logs the information at block 381.

With reference again to the swim-lane of the proxy, a scan of its cache is executed at block 384 whenever a predetermined time-out expires (for example, every day); in this phase, the scanner looks for the signature files (identified by their names, together with the sizes and timestamps) that indicate the availability of the corresponding software products. The flow of activity continues to block 387, wherein the catalogue is updated according to the result of the scanning; particularly, new software products are added to the catalogue, whereas any software product being invalidated is removed. In this way, the overhead of the proxy (for the operations required to keep the catalogue up-to-date) is negligible. The method then ends at the concentric black/white stop circles 390.

Similar considerations apply if the method includes equivalent or additional steps.

Although the invention has been described above with a certain degree of particularity with reference to preferred embodiment(s) thereof, it should be understood that various changes in the form and details as well as other embodiments are possible.

For example, the reference to software products must not be interpreted in a limitative manner; indeed, the proposed solution can be applied to download text files (such as books or scientific articles), music or movie files, multimedia works, video games, or more generally any other digitally encoded product.

Moreover, the reference to e-commerce is merely illustrative and different applications are contemplated (for example, to distribute in a push mode software products within the network of an enterprise).

Similar considerations apply to different data processing systems with distributed architecture; for example, the proxies can be replaced with one or more similar intermediate computers that are interposed between a generic source computer and a generic target computer.

The solution of the invention is also suitable to be implemented with another transmission protocol, which divides the product into consecutive equivalent packets (for example, datagrams in the UDP specification).

Likewise, the signature files can be replaced with different identification information (for example, a unique code of the product associated with the name of its distribution package), or the first packet can be encapsulated into an equivalent frame.

The solution of the invention also leads itself to be implemented with any other memory structure providing an indication of the products available on the intermediate computer (such as a simple table).

Alternatively, the cache is scanned with another frequency (even customizable), or different information is searched for updating the catalogue.

Moreover, it will be apparent to those skilled in the art that the additional features providing further advantages are not essential for carrying out the invention, and may be omitted or replaced with different features.

For example, the use of the method with a different transmission protocol (even not of the packet-switched type) is not excluded. Moreover, the identification information can be associated with the product in another way, or the availability of the software product can be determined exploiting other information (in this case, no de-tunneling might be needed on the clients).

Alternatively, the catalogue is updated in real-time (whenever a new software product is cached or an available software product is invalidated); in any case, the solution of the invention leads itself to be implemented even without any catalogue (with the agent that searches the desired software product in the cache directly).

Moreover, different implementations of the solution of the invention do not require an explicit authorization of the proxy by the server (for example, when applied within an enterprise network). It should be noted that it is also possible to avoid notifying the completion of the downloading from the proxy to the server.

In addition, the programs can be distributed on any other computer readable medium (such as a DVD); alternatively, the programs are pre-loaded onto the hard-disks, are sent to the computers through the network, are broadcast, or more generally are provided in any other form directly loadable into the working memories of the computers. However, the method according to the present invention is also suitable to be carried out with a hardware structure (for example, integrated in chips of semiconductor material), or with a combination of software and hardware.

Naturally, in order to satisfy local and specific requirements, a person skilled in the art may apply to the solution described above many modifications and alterations all of which, however, are included within the scope of protection of the invention as defined by the following claims.

The invention claimed is:

1. A method of downloading digitally encoded products in a data processing system with distributed architecture, the method including the steps of:
   a source computer starting delivering a product to a target computer,
   an intermediate computer between the source computer and the target computer detecting the starting of the delivering,
   the intermediate computer verifying an availability of a copy of the product on the intermediate computer,
   the intermediate computer notifying the availability to the source computer,
   the source computer stopping the delivering in response to the notification of the availability, and
   the intermediate computer delivering the copy of the product to the target computer;
   wherein the source computer enables the intermediate computer to deliver the copy of the product to the target computer in response to the notification of the availability.

2. The method according to claim 1, wherein the product includes a plurality of consecutive packets, the method further including the steps of:
   the source computer associating a first packet with identification information of the product.

3. The method according to claim 2, wherein the step of associating the first packet with the identification information includes encapsulating the packet into a predefined frame including the identification information, the method further including the steps of:
   the target computer extracting the first packet from the frame, and
   the intermediate computer extracting the identification information from the frame.

4. The method according to any claim from 1, further including the step under the control of the intermediate computer of storing a memory structure including an indication of the products available on the intermediate computer, the step of verifying the availability of the copy of the product on the intermediate computer including searching the indication of the product in the memory structure.

5. The method according to claim 4, further including the steps under the control of the intermediate computer of:
   periodically scanning the intermediate computer, and
   updating the memory structure according to a result of the scanning.

6. The method according to claim 1, further including the step of:
   the intermediate computer notifying a completion of the delivering to the source computer.

7. A computer program including program code means directly loadable into a working memory of a data processing system with distributed architecture for performing the method of claim 1 when the program is run on the system.

8. A program product including a computer readable medium embodying the program of claim 7.

9. A data processing system with distributed architecture for downloading digitally encoded products, the system including at least one source computer having means for starting delivering a product to a target computer and at least one intermediate computer between the source computer and the target computer having means for detecting the starting of the delivering, means for verifying an availability of a copy of the product on the intermediate computer, means for notifying the availability to the source computer, and means for delivering the copy of the product to the target computer, the source computer further including means for stopping the delivering in response to the notification of the availability and including means for enabling the intermediate computer to deliver the copy of the product to the target computer in response to the notification of the availability.

* * * * *